United States Patent [19]

Kirschmann

[11] 4,260,459
[45] Apr. 7, 1981

[54] VENTED WATER DISTILLER

[76] Inventor: John D. Kirschmann, 933 Anderson St., Bismarck, N. Dak. 58501

[21] Appl. No.: 942,118

[22] Filed: Sep. 13, 1978

[51] Int. Cl.³ .............................................. B01D 3/02
[52] U.S. Cl. .................................... 202/200; 202/206
[58] Field of Search ............... 202/160, 162, 206, 263, 202/167, 234, 239, 242, 256, 258, 269, 270, 200, 182, 185 B, 235; 137/625.48

[56] References Cited

U.S. PATENT DOCUMENTS

| | | | |
|---|---|---|---|
| 2,079,897 | 5/1937 | Brown | 202/206 |
| 3,674,650 | 7/1972 | Fine | 203/DIG. 16 |
| 3,694,321 | 9/1972 | Marovich et al. | 202/200 |
| 4,078,579 | 3/1978 | Bucko | 137/625.48 |

Primary Examiner—Frank Sever

Attorney, Agent, or Firm—Williamson, Bains, Moore & Hansen

[57] ABSTRACT

A batch operation water distiller is provided with a venting valve between the boiling chamber and the condenser. Operation of the venting valve during the heating phase prior to boiling allows entrained gases such as chlorine to be vented to the atmosphere rather than into the condenser and hence into the purified water. The valve may also be used as a humidification device for the area in which the distiller is operated. A screen-like shield is provided about the condenser inlet so as to prevent bubbles of unpurified water from entering the condenser passage. Also, a flexible fill tube is provided which allows the distilling chamber to be filled prior to use and then drained after use so as to remove mineral laden water from the chamber.

7 Claims, 2 Drawing Figures

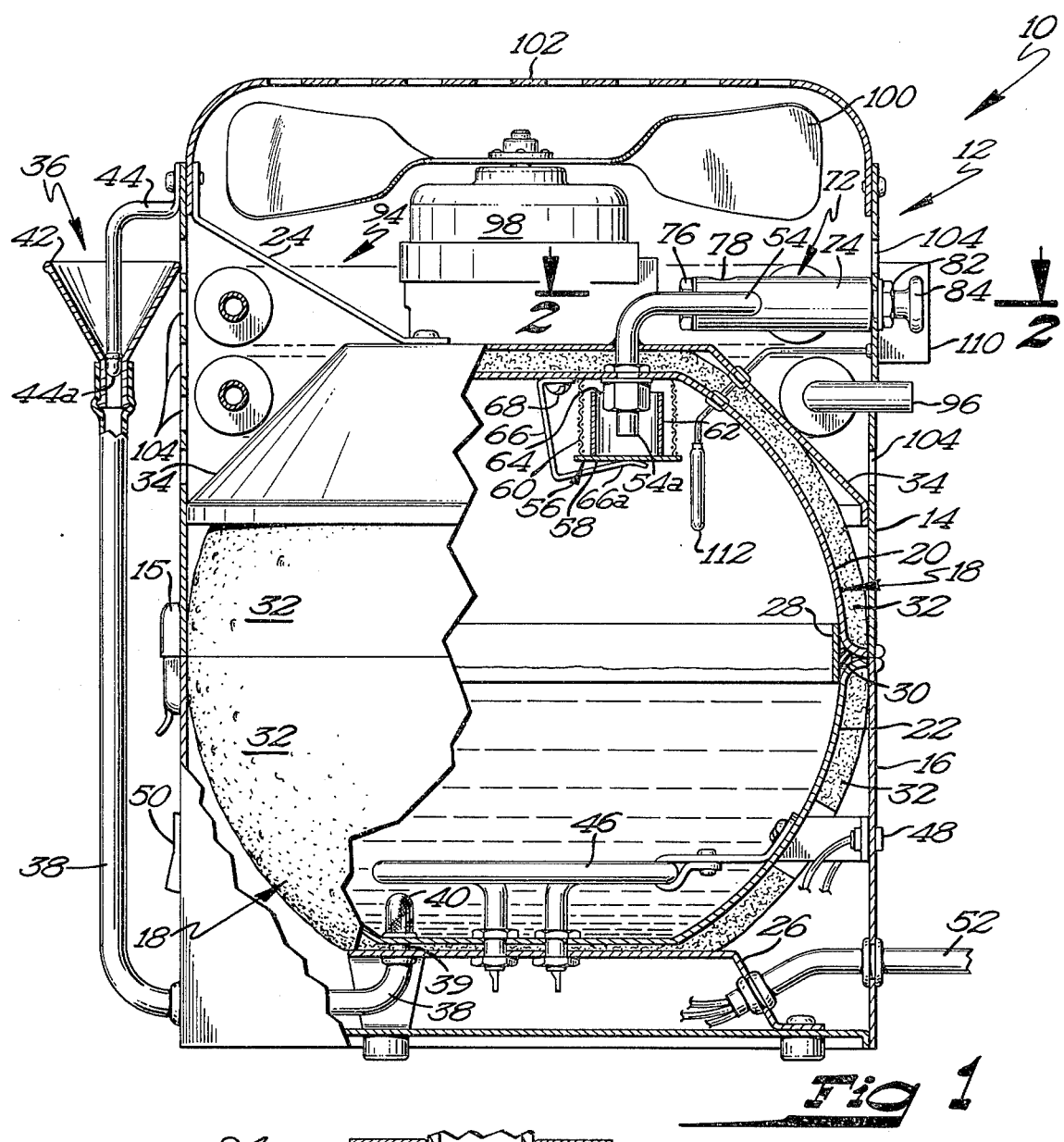
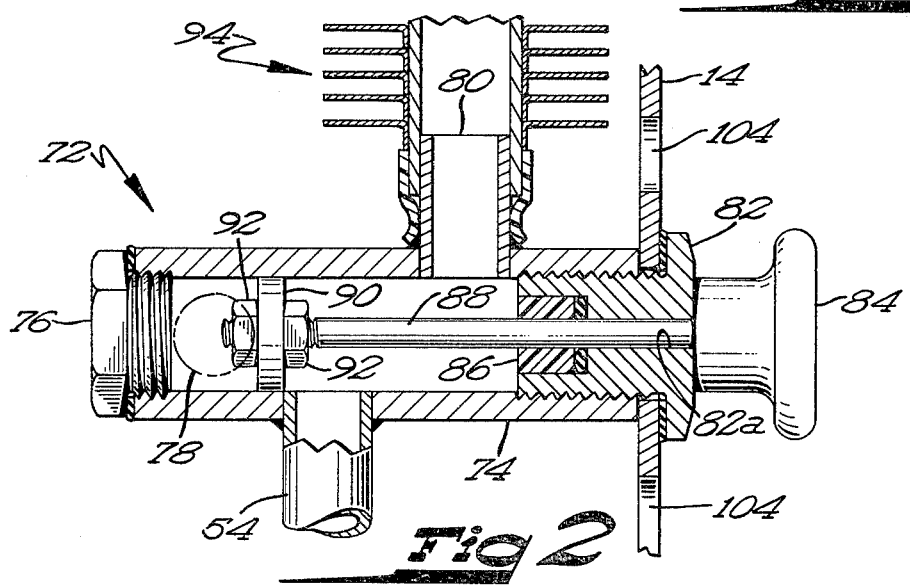

VENTED WATER DISTILLER

BACKGROUND OF THE INVENTION

In recent years there has been an increasing demand for water that is purer than that normally available from the tap due to the various pollutants and other non-natural substances present in tap water. While various distilling apparatus have been built, none offer the degree of efficiency and low cost desired by the home user. Various air cooled distilling units have been proposed such as U.S. Pat. No. 3,935,077 and U.S. Pat. No. 3,838,016. Such units are not well suited to home use in that they are unduly complex and therefore more expensive than need be.

Also, it has been discovered that during the heating phase various gases which are entrained in unpurified water such as chlorine are released. If such water is used in a normal distiller, these gases will collect in the condenser area and in any collection container such that once purified water vapor condenses in those areas, the chlorine and other gases will be reabsorbed into the water thus preventing truly pure water from being obtained.

It is therefore an object of this invention to provide a distillation device which will efficiently purge the noxious chlorine and other gases from the system and thereby prevent the reentrainment of those gases as happens with the system presently in use.

It is further an object of this invention to provide a device which prevents foaming in the boiling chamber from entering the condenser area thus allowing unpurified water to mix with the condensate. Finally, it is an object of this invention to provide a batch operation distillation device which is easily filled and drained and yet which is inexpensive to manufacture and operate.

SUMMARY OF THE INVENTION

An air cooled batch operaton distiller is formed with a substantially spherical heating chamber having a heating element located at the bottom. A fill and drain aperture is located at the bottom of the chamber and leads to a flexible fill tube having a funnel at its upper end. The funnel is held in place during operation by a locating plug mounted to the side of the housing and which locates the funnel relative to the housing and plugs the funnel in order to prevent steam or water from exiting through the fill tube to the atmosphere. After operation, the funnel may be detached and the mineral-laden residue water in the boiling chamber allowed to drain out by moving the funnel and tube to a level lower than that of the chamber. To fill the device, the funnel is lifted and water poured thereinto such that when the water level has reached the desired height in the chamber the funnel is then attached to the side of the device by means of the plug and ready for operation.

There is provided at the top of the boiling chamber an outlet tube which leads to the condenser. The heating chamber outlet is surrounded by a muffler or bubble elimination device comprised of a solid cup which extends to a level above the outlet tube and which is surrounded by a cylindrical screen which serves to break up the bubbles. The muffler is removably clipped to the wall of the heating chamber. The heating chamber outlet tube leads to a gas venting valve. The vent valve has two positions, the first of which serves to direct all flow from the heating chamber into the condenser. The second position or vent position serves to vent all flow from the heating chamber to the atmosphere. The condenser is arranged about the circumference of the upper housing and is arranged so that an electrically powered fan will draw cool room air through the housing and over the condenser to efficiently cool and condense the distilled water vapor.

In practice, once heating of the water to be purified is started the vent valve is moved to the vent position. Upon the liquid passing through the range of 150° Fahrenheit to 200+° Fahrenheit, various gases such as chlorine and the like entrained in the water will be released and passed through the vent valve into the atmosphere. At the point where the water begins to boil, the vast majority of these gases will have been released at which point the valve may be moved to the condenser position thereby directing the water vapors through the condenser and providing for normal distiller operation. Also if desired, the valve may be moved to the vent position during boiling in order to humidify the room due to the water vapor that will be vented into the room and expelled upwardly by the fan mounted in the housing.

These and other objects and advantages of this invention will more fully appear from the foregoing description made in connection with the accompanying drawings, wherein like reference characters refer to the same or similar parts throughout the several views.

DESCRIPTION OF THE DRAWING FIGURES

FIG. 1 is a cutaway view of the distillation device of the instant invention.

FIG. 2 is a sectional view taken along lines 2-2 of FIG. 1 showing the vent valve structure.

DESCRIPTION OF THE PREFERRED EMBODIMENT

A distillation device 10 is provided with a cylindrical housing 12 formed of an upper half 14 and a lower half 16. The sperical boiling chamber 18 located therein is comprised of an upper half 20 and lower half 22. Upper chamber half 20 is fastened to upper housing 14 by means of bracket 24, and lower chamber 22 is correspondingly fastened to lower housing 16 by means of bracket 26. A circular lip 28 is attached to chamber upper half 20 and serves to aid in mating and aligning the two portions of the chamber during assembly as well as to promote sealing. One or more latches 15 are provided to secure the housing and chamber halves. O-ring 30 is provided behind lip 28 to further assist in sealing. Insulation 32 is provided about chamber 18 in order to promote efficiency in heating as well as to prevent heating of the surrounding area. A conical heat shield 34 is provided adjacent insulation 32 to shield the condenser area from the heat of heating chamber 18.

A drain and fill tube 38 is provided and connects at one end to the bottom of heating chamber 18 through aperture 39 which is in turn covered by screen 40 which serves to filter out larger particles. Flush and fill tube 38 passes through housing 12 and is formed of a flexible plastic tubing which can withstand the temperatures associated with boiling water. Flush and fill tube 38 fits over the end of a funnel 42. A retaining plug 44 is attached to the side of housing 12 well above the water level and is provided at one end with a plugs 44a which will engage a portion of funnel 42 so as to retain funnel 42 in contact therewith as well as to prevent water and/or water vapor from being blown upwardly out of funnel 42 by the pressure within chamber 18. A burner element 46 is located in the bottom of chamber 18 and is connected with indicator light 48, switch 50 and plug 52 for connection to an appropriate source of power.

The end 54a of boiling chamber outlet 54 extends downwardly into chamber 18 through the top of upper chamber 20. Chamber outlet 54a is surrounded by muffler 56 which serves to prevent entrance of bubbles of unvaporized liquid into the condenser tubing. Muffler 56 is comprised of a horizontal, circular disk 58 having around its outer perimetry an upstanding screen 60 which extends from disk 58 to the top of upper chamber 20. Muffler 56 further has located therein solid cylindrical member 62 which extends above the bottom of outlet 54a but yet not to the top of upper chamber 20 thereby providing a circular passageway 64 through which only water vapor will pass en route to chamber outlet 54. An L-shaped retaining clip 66 is provided to retain muffler 56 in position. A screw 68 secures clip 66 to upper chamber 20 and the opposite end 66a abuts disk member 58 of muffler 56 in order to locate muffler 56.

Outlet pipe 54 leads from chamber outlet end 54a to gas vent valve 72. Vent valve 72 is shown in detail in FIG. 2 and is comprised generally of a cylindrical main body 74 threadingly plugged at one end by plug member 76. A vent passage 78 is provided through body 74 adjacent end plug 76. Moving axially along body 74, there are located vent passage 78, chamber outlet 54 and condenser inlet passage 80 respectively. A second end plug 82 is threadedly engaged into the opposite end of valve body 74 and has a passage 82a therein for passage of valve shaft 88 therethrough. A conventional seal member 86 provides a seal between shaft 88 and end plug 82 while at the same time allowing sliding movement therebetween. A knob 84 is located at one end of valve shaft 88 and is located outside housing 12 so as to allow operation of the valve. Two stop nuts 92 are threadably located on the other end of valve shaft 88 and sandwiched therebetween is valve sealing disk 90 which may be made of Teflon or any other suitable substance.

Thus when the device is positioned as shown in FIG. 2, vapor and/or gases will enter valve 72 through chamber outlet 54 and pass into condenser inlet 80 through valve body 74. By moving valve disk 90 to the right side of chamber outlet 54 as viewed in FIG. 2 by operation of knob 84, gases entering valve body 74 through passage 54 will be vented to the atmosphere via vent passage 78 which is open to the air inside housing 12.

Of course, while one construction of vent valve 72 has been shown, it should be appreciated that numerous other types of valves may be used so long as the valve is a hydraulic analog of a single pole double throw switch. If desired, the valve may be continuously variable between the two positions so as to be able to provide some humidification during water purification.

Condenser 94 runs about the circumference of upper housing 14 and terminates in pure water outlet 96. A number of air inlet apertures 104 are located about upper housing 14 and provide an inlet for air to flow over the condenser to assist in cooling. An electric motor 98 drives fan 100 located at the top of upper housing 14 and serves to draw air inwardly through apertures 104, across condenser 94, and through the screen 102 which covers the upper end of upper housing 14 thus serving to cool the device.

The device may also be fitted for automatic operation by providing a temperature sensor 112 in the heating chamber 18. Sensor 112 is then connected to valve activator 110 shown in phantom in FIG. 1. Actuator 110 positions vent valve 72 in the vent position while the temperature in the chamber 18 is less than about 212° Fahrenheit. Upon boiling taking place in chamber 18, actuator 110 shifts vent valve 72 to the condenser position. Various valve actuators, either integral or attached, and temperature sensors are in general well-known in the art.

Operation of the device is quite simple. First, one disconnects the funnel 42 and fill tube 38 from plug member 44 by pulling downwardly on funnel 42. One then fills the heating chamber 18 to the desired level by pouring water into funnel 42. Then the funnel 42 and fill tube 38 are replaced in the position shown in FIG. 1 wherein plug end 44a located and plugs the outlet of tube 38 so as to prevent steam or water from being forced upwardly therethrough.

Next, the vent valve 72 is moved to the vent position, by pulling outwardly on knob 84 and moving valve disc 90 to the right side of heating chamber outlet 54 as viewed in FIG. 2. Upon activating the heating element 46, gases entrained in the water such as chlorine will slowly be given off and exit through chamber outlet 54, outlet passage 70 and vent passage 78 into the atmosphere whereupon they will be dissipated by the action of fan 100. Upon the water in chamber 18 starting to boil, the vent valve is moved by pressing inwardly on knob 84 to the position shown in FIG. 2 thereby diverting the flow of water vapor into condenser inlet 80 and thence into condenser 94 where, as it flows about the housing, the vapor gradually condenses and drips out of pure water outlet 96.

Should it be desired to humidify the room, vent valve 72 can be moved fully or at least partially to the vent position such as that shown in phantom in FIG. 2 thereby allowing water vapor to exit to the surrounding area.

Upon completion of the distillation cycle, the heating is stopped and fill tube 38 along with funnel 42 are disengaged from locating plug 44 and moved to position below the bottom of chamber 18 thereby allowing the mineral laden residue water located in chamber 18 to drain from the unit and prevent mineral buildup therein.

While the preferred embodiments of the present invention have been described, it should be understood that various changes, adaptations and modifications may be made therein without departing from the spirit of the invention and the scope of the appended claims.

What is claimed is:

1. Distilling apparatus comprising:
   a heating chamber having an outlet extending downwardly into said chamber at the upper end thereof;
   a condenser disposed above said heating chamber and having a distillate outlet end and an inlet end in fluid flow communication with said heating chamber outlet;
   means coacting to prevent the entrance of bubbles into said heating chamber outlet consisting essentially of a cylindrical screen member having first and second ends, said screen member surrounding said chamber outlet with said first end thereof located closely adjacent to the top wall of said heating chamber at said upper end of said chamber and with said second end of said screen member being below said heating chamber outlet, an imperforate disc closing said second end of said screen member, and a solid cylindrical member positioned coaxially with and inside of said cylindrical screen member around said heating chamber outlet, said solid cylindrical member having a first, bottom end abutting against said disc and affixed thereto so as to define a cup therewith and a second, top end spaced from said heating chamber top wall so as to allow the passage of vapor thereover and into said heating chamber outlet, said screen member having apertures sized to prevent the passage of bubbles therethrough.

2. The distilling apparatus of claim 1 further comprising an inlet at the bottom of said chamber;

a flexible tube having first and second ends, said first end being a flexible tube connected to said chamber inlet, said tube being movable from a first position where said tube second end is above said chamber for filling of said chamber to a second position below said chamber for draining said chamber of mineral laden water.

3. The distilling apparatus of claim 2 further comprising means for plugging and fixedly retaining the second end of said tube adjacent the top of said chamber so as to prevent liquid and vapor from being forced up through said tube during operation.

4. The distilling apparatus of claim 3 wherein said plugging and retaining means comprises a downwardly extending member shaped to snugly engage the interior of said tube second end.

5. The distilling apparatus of claim 9 wherein said means for preventing the entrance of bubbles into said heating chamber outlet further comprises an L-shaped clip having an upper end attached to said heating chamber top wall and a bottom end bearing against the underside of said disc and holding said first end of said cylindrical screen member against said heating chamber top wall.

6. The distilling apparatus of claim 9, and further comprising valve means having an inlet connected to said heating chamber outlet, a first outlet connected to said condenser inlet end and a second outlet vented to the atmosphere, said valve means being operative between a first position connecting said valve inlet with said first valve outlet and a second position connecting said valve inlet to said second valve outlet.

7. The distilling apparatus of claim 6 further comprising control means responsive to the temperature in said chamber wherein said control means positions said valve means in said first position when the chamber temperature is greater than about the boiling temperature of water and wherein said control means positions said valve means in said second position when the chamber temperature is less than about the boiling temperature of water.

* * * * *

UNITED STATES PATENT AND TRADEMARK OFFICE
CERTIFICATE OF CORRECTION

PATENT NO. : 4,260,459

DATED : April 7, 1981

INVENTOR(S) : John D. Kirschmann

It is certified that error appears in the above-identified patent and that said Letters Patent are hereby corrected as shown below:

Column 4, line 16, delete "located" and insert --locates--.

Column 6, claim 5, line 1, delete "9" and insert --1--.

Column 6, claim 6, line 1, delete "9" and insert --1--.

Signed and Sealed this

Twenty-ninth Day of September 1981

[SEAL]

Attest:

Attesting Officer

GERALD J. MOSSINGHOFF

Commissioner of Patents and Trademarks